United States Patent [19]

Tamura et al.

[11] Patent Number: 4,717,694

[45] Date of Patent: Jan. 5, 1988

[54] DIELECTRIC CERAMIC COMPOSITION FOR HIGH FREQUENCIES

[75] Inventors: Hiroshi Tamura, Kyoto; Djuniadi A. Sagala, Nagaokakyo, both of Japan

[73] Assignee: Murata Manufacturing Co., Ltd., Japan

[21] Appl. No.: 916,305

[22] Filed: Oct. 7, 1986

[30] Foreign Application Priority Data

Oct. 9, 1985 [JP] Japan ............................... 60-225627

[51] Int. Cl.$^4$ ...................... C04B 35/00; C04B 35/48
[52] U.S. Cl. .................................................... 501/135
[58] Field of Search .......................................... 501/135

[56] References Cited

U.S. PATENT DOCUMENTS 4,485,180  11/1984  Konoike et al. ................... 501/135

FOREIGN PATENT DOCUMENTS 58-60661  7/1981  Japan .

Primary Examiner—Mark L. Bell
Attorney, Agent, or Firm—Ostrolenk, Faber, Gerb & Soffen

[57] ABSTRACT

A dielectric ceramic composition for high frequencies consists essentially of $Ba(Zr_xZn_yNi_zTa_uNb_v)O_{7/2-x/2-3y/2-3z/2}$, wherein x, y, z, u and v are mole fractions of respective components and fall within the range of $0.01 \leq x \leq 0.06$, $0.28 \leq y \leq 0.33$, $0.01 \leq z \leq 0.05$, $0.52 \leq u \leq 0.65$, and $0 < v \leq 0.13$, and wherein $x+y+z+u+v=1.00$.

5 Claims, No Drawings

DIELECTRIC CERAMIC COMPOSITION FOR HIGH FREQUENCIES

FIELD OF THE INVENTION

This invention relates to a dielectric ceramic composition for high frequencies.

BACKGROUND OF THE INVENTION

In a high frequency region including microwave frequencies and millimeter wave frequencies, dielectric ceramic materials have been used widely for high frequency circuit elements such as dielectric resonators, microwave integrated circuits, and the like. The dielectric ceramic materials for such elements are required to have a high Q value and a low temperature coefficient of resonant frequency. To this end, there have been proposed various dielectric ceramic compositions as a material for high frequency circuit elements.

For example, U.S. Pat. No. 4485180 discloses a dielectric ceramic composition consisting of $Ba(Zr_xZn_yTa_z)O_{7/2-x/2-3y/2}$, wherein $0.02 \leq x \leq 0.13$, $0.28 \leq y \leq 0.33$, $0.59 \leq z \leq 0.65$, and $x+y+z=1$, and having a peak Q value of 9100 together with a temperature coefficient of resonant frequency of 1 ppm/°C. at an operating frequency of 7 GHz.

Japanese patent laying-open No. 58-60661 discloses a dielectric ceramic composition consisting of $Ba(Zn_vNi_xTa_yNb_z)O_{7/2-3v/2-3x/2}$, wherein $0.03 \leq v \leq 0.33$, $0.03 \leq x \leq 0.33$, $0 \leq y \leq 0.70$, $0 \leq z \leq 0.70$, and $v+x+y+z=1$, and having a peak Q value of 10300 together with a temperature coefficient of resonant frequency of 0 ppm/°C. at an operating frequency of 7 GHz.

These dielectric ceramic compositions can be used for circuit elements designed to operate at a high frequency of around 10 GHz and below but the disadvantage of such compositions is that they can not be used to produce microwave elements designed to operate at a frequency higher than 10 GHz since the Q value decreases with increase of an operating frequency. Recently, there is a tendency to operate electronic devices at higher frequencies, Thus, there is an increasing demand of dielectric ceramic compositions having a higher Q value together with a small temperature coefficient of resonant frequency.

SUMMARY OF THE INVENTION

It is therefore an object of the present invention to provide a dielectric ceramic composition for high frequencies having a higher Q value in a high frequency region, as compared with that of the compositions of the prior art.

Another object of the present invention is to provide a dielectric ceramic composition for high frequencies which can be used for higher frequency circuit elements designed to operate in a frequency region of 10 to 50 GHz.

According to the present invention, these objects are solved by proving a dielectric ceramic composition consisting essentially of $Ba(Zr_xZn_yNi_zTa_uNb_v)O_{7/2-x/2-3y/2-3z/2}$, wherein x, y, z, u and v are mole fractions of respective elements and fall within the range of $0.01 \leq x \leq 0.06$, $0.28 \leq y \leq 0.33$, $0.01 \leq z \leq 0.05$, $0.52 \leq u \leq 0.65$, and $0 < v \leq 0.13$, and wherein $x+y+z+u+v=1.00$.

The reasons why the mole fractions of the respective elements, i.e., x, y, z, u and v have been limited as being within the above range are as follows: If x is less than 0.01, the composition does not sinter. If x exceeds 0.06, the Q value becomes lowered. Thus, the mole fraction of Zr has been limited to a value within the range of 0.01 to 0.06. If y is less than 0.28 or exceeds 0.33, the composition does not sinter. Thus, the mole fraction of Zn has been limited within the range of 0.28 to 0.33. If z is less than 0.01, the composition does not sinter. If z exceeds 0.05, the Q value becomes lowered. Thus, the mole fraction of Ni has been limited to a value within the range of 0.01 to 0.05. If u is less than 0.52 or exceeds 0.65, the composition is not sintered. Thus, the mole fraction of Ta has been limited to a value within the range of from 0.52 to 0.65. If v exceeds 0.13, the Q value becomes lowered. Thus, the mole fraction of Nb has been limited to a value of less than 0.13

The dielectric ceramic composition according to the present invention has a higher Q value even at a microwave frequency, as compared with the composition of the prior art, together with a small temperature coefficient of resonant frequency. Thus the dielectric ceramic composition of the present invention can be used to produce microwave devices designed to operate at a frequency ranging from 10 to 50 GHz.

These and other objects, features and advantages of the present invention will be more apparent from the following description with respect to examples of the present invention.

EXAMPLE

Using highly purified powder of $BaCO_3$, $ZrO_2$, $ZnO$, $NiO$, $Ta_2O_5$ and $Nb_2O_5$ there were prepared mixtures so as to produce dielectric ceramics each having a composition shown in Table 1. Each mixture was milled by the wet process for 2 hours, dehydrated, dried, calcined at 1200° C. for 2 hours, and then powdered. The resultant powder was granulated with a suitable amount of binder by milling for 2 hours. The resultant powder was compacted to form discs having a diameter of 12 mm and a thickness of 6 mm under a pressure of 2000 kg/cm² and then fired at 1450° C. for 4 hours to prepare ceramic specimens.

The specimens were subjected to measurements of dielectric characteristics at high frequencies. The measurements were made on dielectric constant ($\epsilon r$), Q value and a temperature coefficient of resonant frequency ($\tau f$) at 7 GHz. Results obtained are shown in Table 1.

TABLE 1

| Specimen No. | Composition (mole fraction) | | | | | Electrical characteristics At 7 GHz | | |
|---|---|---|---|---|---|---|---|---|
| | x | y | z | u | v | $\epsilon r$ | Q | $\tau f$(ppm/°C.) |
| 1 | 0.02 | 0.28 | 0.05 | 0.64 | 0.01 | 29.5 | 15600 | 0 |
| 2 | 0.02 | 0.28 | 0.05 | 0.52 | 0.13 | 30.7 | 15100 | −5 |
| 3 | 0.05 | 0.29 | 0.03 | 0.58 | 0.05 | 30.5 | 17000 | 6 |
| 4 | 0.02 | 0.30 | 0.03 | 0.60 | 0.05 | 30.0 | 17500 | 1 |
| 5 | 0.03 | 0.29 | 0.03 | 0.55 | 0.10 | 30.8 | 16000 | 7 |
| 6 | 0.03 | 0.32 | 0.01 | 0.63 | 0.01 | 31.2 | 13200 | 2 |
| 7 | 0.02 | 0.32 | 0.01 | 0.52 | 0.13 | 31.8 | 12900 | 7 |
| 8* | 0.02 | 0.23 | 0.10 | 0.58 | 0.07 | 28.8 | 6400 | −7 |
| 9* | 0.04 | 0.29 | 0.03 | 0.47 | 0.16 | 32.0 | 7600 | 15 |
| 10* | 0.03 | 0.32 | 0.00 | 0.58 | 0.07 | not sinterable | | |
| 11* | 0.08 | 0.28 | 0.03 | 0.56 | 0.05 | 31.9 | 8900 | 12 |

In Table 1, specimens with an asterisk are those having a composition beyond the scope of the present invention, while other specimens are those included in the scope of the present invention.

From the results for the specimens Nos. 1 to 7, it can be seen that the dielectric ceramic compositions of the present invention have a high dielectric constant and a high Q value in a microwave frequency region. In addition, the dielectric ceramic compositions of the present invention has a peak Q value of 17500 at 7 GHz, which is about 1.7 times that of the conventional composition, together with a small temperature coefficient of resonant frequency of 1 ppm/°C.

What I claim is:

1. A dielectric ceramic composition for high frequencies consisting essentially of $Ba(Zr_xZn_yNi_zTa_uNb_v)O_{7/2-x/2-3y/2-3z/2}$, wherein x, y, z, u and v are mole fractions of respective elements and fall within the range of $0.01 \leq x \leq 0.06$, $0.28 \leq y \leq 0.33$, $0.01 \leq z \leq 0.05$, $0.52 \leq u \leq 0.65$, and $0 < v \leq 0.13$, and wherein $x+y+z+u+v=1.00$.

2. The dielectric ceramic composition of claim 1 wherein $0.02 \leq x \leq 0.05$, $0.28 \leq y \leq 0.32$, $0.52 \leq u \leq 0.64$ and $0.01 \leq v \leq 0.13$.

3. The dielectric ceramic composition of claim 2 wherein x is 0.02.

4. The dielectric ceramic composition of claim 2 wherein x is 0.03, $0.29 \leq y \leq 0.32$, $0.01 \leq z \leq 0.03$, $0.55 \leq u \leq 0.63$ and $0.01 \leq v \leq 0.1$.

5. The dielectric ceramic composition of claim 2 wherein x is 0.05, y is 0.29, z is 0.03, u is 0.58 and v is 0.05.

* * * * *